United States Patent Office 3,505,532
Patented Apr. 7, 1970

3,505,532
PULSE PRODUCING CIRCUIT
David J. Steele, Stafford, England, assignor to Westinghouse Electric Corporation, Pittsburgh, Pa., a corporation of Pennsylvania
Original application Oct. 27, 1967, Ser. No. 678,597. Divided and this application Apr. 25, 1969, Ser. No. 819,141
Int. Cl. H03k 3/64
U.S. Cl. 307—106                   5 Claims

ABSTRACT OF THE DISCLOSURE

An electrical circuit which provides voltage pulses of like polarity during the positive and negative half cycles of an AC source potential, initiated by the turning off of an AC switch at current zero. The pulses during a predetermined polarity of the AC source potential are provided by a Zener diode in direct response to the AC source potential, with a capacitor also being charged during this polarity of the AC source potential. The pulses during the other polarity of the AC source potential are provided by the Zener diode, with the capacitor as the energy source.

CROSS REFERENCES TO RELATED APPLICATIONS

This application is a division of application Ser. No. 678,597, filed Oct. 27, 1967.

BACKGROUND OF THE INVENTION

Field of the invention

The invention relates in general to pulse producing circuits, and more specifically to pulse producing circuits of the type which provide pulses synchronized with the opening of a static AC switch.

Description of the prior art

Phase control circuits of the prior art which utilize controllable AC switches for such applications as controlling the speed of AC motors, commonly utilize either a power supply transformer or a pulse transformer in order to isolate the control circuit from the AC switch. Such transformers are relatively heavy and costly. Thus, it would be desirable to provide a pulse circuit which initiates a control voltage pulse during both the positive and negative half cycles of an AC source potential, which are of like polarity, which are synchronized with the opening of an AC switch, which does not utilize a pulse transformer, and which may be used in such applications as motor speed control systems, without requiring an isolating transformer.

SUMMARY OF THE INVENTION

Briefly, the invention discloses a circuit for providing control voltage pulses of like polarity which may be used to control a phase controlled firing circuit for a solid state AC switch. The circuit provides control voltage pulses of like polarity during each half cycle of the source of AC potential, for example positive voltage pulses, which pulses are initiated by the switching of the AC switch from its low impedance state to its high impedance state. During the positive half cycle of the AC source potential, a voltage pulse of predetermined magnitude is provided across a voltage regulating diode, which is initiated by a voltage appearing across the AC switch when it switches to its "open" condition. Also, during the positive half cycle, a capacitor is charged. Then, during the negative half cycle, when the AC switch switches to its high impedance condition, the capacitor is operatively connected across the voltage regulating diode, providing a voltage pulse which is the same magnitude and polarity as that provided during the positive half cycle. Since a similar control voltage pulse is provided each half cycle of the source potential, which is initiated by the "opening" of the AC switch, the voltages pulses may be used as a control voltage for a phase controlled firing circuit, such as the type which utilizes a unijunction transistor.

BRIEF DESCRIPTION OF THE DRAWINGS

Further advantages and uses of the invention will become more apparent when considered in view of the following detailed description and drawings, in which.

DESCRIPTION OF THE PREFERRED EMBODIMENTS

This invention relates to speed control systems for single phase AC motors of the type which utilize a controllable solid state bilaterally switchable AC switch, such as those of the silicon semiconductor type, connected in series with a source of AC potential and a winding of the motor to be controlled. A controllable solid state AC switch, which is generically termed a TRIAC to denote its three electrode structure, includes a p-n-p-n switch in parallel with an n-p-n-p switch between its main electrodes, which are called T1 and T2, along with a control or gate electrode G. A gate current of specified amplitude of either polarity will trigger the controllable AC switch into conduction, regardless of the polarity of the voltage at the switch terminals. However, since the magnitude of the positive gate current required to trigger the AC switch when terminal T2 is negative is relatively high, it is preferable to trigger the AC switch with negative gate currents on both polarities of AC switch voltage; or, with a positive gate current when terminal T2 is positive, and with a negative gate current when terminal T2 is negative. After the AC switch has switched to its conductive state, it will remain conductive until the current therethrough drops below its holding value, thus switching it to its nonconductive state at current zero of an alternating current.

A single controllable AC switch possesses many advantages over the alternatives of using two back-to-back, parallel connected semiconductor controlled rectifiers, or a single semiconductor controlled rectifier connected between the output terminals of a single phase, full wave bridge rectifier, such as reducing the package size of the control system, increasing the reliability of the system, simplifying the circuitry, and reducing its cost. However, since the main terminals of the AC switch may be of either polarity, the above-mentioned advantages may not be realized if the control circuit, and its associated power supply and timing circuitry is unduly complicated. For example, in phase control circuits of the prior art, which utilize a solid state AC switch to control electrical power, it is common to utilize at least one transformer to isolate the AC switch from the firing control, such as a power transformer or a pulse transformer. Since transformers are relatively heavy and costly, it would be desirable to be able to eliminate the need of a transformer, without requiring an equally undesirable alternative.

Figure 1:
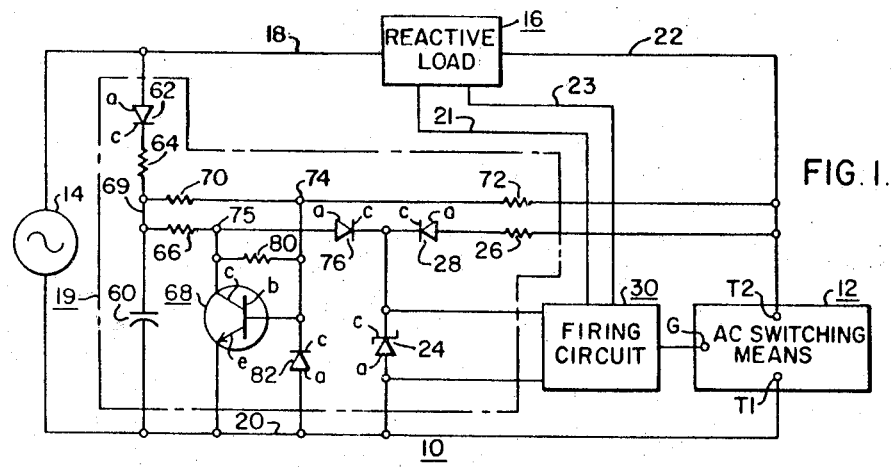
FIGURE 1 is a schematic diagram of an electrical circuit which provides a positive voltage pulse with respect to the control electrode of a solid state controllable AC switch, for either polarity of AC switch voltage.

FIG. 1 is a schematic diagram of an electrical circuit 10 constructed according to the teachings of the invention, which provides a positive voltage pulse during each half cycle of a source of AC potential, which is synchronized with the opening of an AC switch. Thus, the circuit may be used as a source of control voltage for a firing circuit for the AC switch.

More specifically, electrical circuit 10 includes AC switching means 12, such as a three electrode silicon AC switch having main terminals T1 and T2, and a control electrode G. The terminals T1 and T2 are connected in series circuit relation with a source 14 of single phase alternating potential, and a reactive load 16, such as a single phase AC motor. Source potential 14 is connected to the load circuit 16 via conductor 18, and terminal T1 of AC switching means 12 via conductor 20. The series circuit is completed by conductor 22 which interconnects the load circuit 16 with terminal T2 of AC switching means 12.

A control voltage circuit 19 and a firing circuit 30 complete the basic electrical circuit 10, with the control voltage circuit 19 providing synchronized positive control voltage pulses for the firing circuit 30. Firing circuit 30 provides firing pulses for AC switching means 12, which pulses are responsive to the control voltage from the control circuit 19, and to a feedback signal from the load circuit 16. The feedback signal from load circuit 16 is indicative of a load condition to be regulated, and it is applied to the firing circuit 30 via conductors 21 and 23.

More specifically, a positive voltage is provided during each half cycle of the source potential 14, synchronized with the switching of the AC switching means 12 to its high impedance condition at current zero of the load current, by connecting a voltage regulating diode 24, such as a Zener diode having anode and cathode electrodes $a$ and $c$, respectively, across the terminals T1 and T2 of AC switching means 12, through a current limiting resistor 26 and an asymetrically conductive device 28, such as a silicon semiconductor diode having anode and cathode electrodes $a$ and $c$, respectively. Resistor 26 is connected to conductor 22, and thus to the terminal T2 of AC switching means 12, and to the anode electrode $a$ of the diode 28. The cathode electrode $c$ of diode 28 is connected to the cathode electrode $c$ of Zener diode 24, and the anode electrode $a$ of Zener diode 24 is connected to conductor 20, and thus to terminal T1 of semiconductor switching means 12.

When the load current passes through zero and AC switching means 12 switches from its conductive to its nonconductive state while terminal T2 is positive, the voltage across the AC switching means 12 will be connected across Zener diode 24. The Zener or breakdown voltage of Zener diode 24 is selected to be less than the voltage which will appear at the terminals of the AC switch 12 when the load current passes through zero and the switch switches to its nonconductive state. Thus, current will flow through resistor 26, diode 28 and Zener diode 24, with the Zener or reverse breakdown voltage appearing across the Zener diode. The firing circuit 30 is connected across Zener diode 24 and to the gate electrode G of AC switching means 12, using the voltage across Zener diode 24 as a control voltage to start the synchronized timing of the firing pulse. When the firing pulse is produced, AC switching means will switch to its conductive state, and the voltage across Zener diode 24 will drop to zero.

Figure 2:
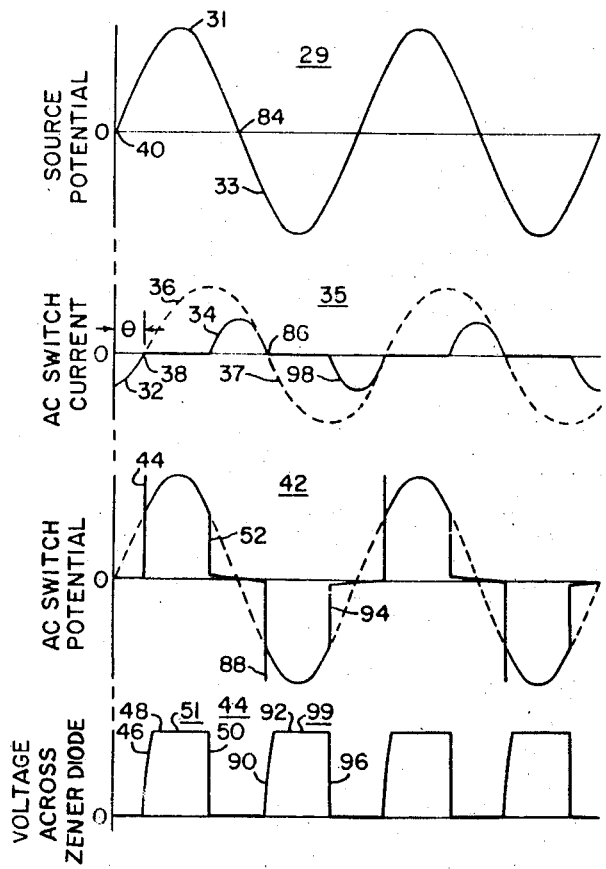
FIG. 2 is a graph which illustrates certain voltage and current waveforms in the electrical circuit of FIG. 1.

FIG. 2 is a graph which illustrates the synchronized production of the voltage across Zener diode 24. The source potential 14 is illustrated with curve 29, which is a sine wave of predetermined frequency, such as 60 Hz., having positive and negative half cycles 31 and 33, respectively, and the current through the AC switching means is shown generally by curve 35, which includes discontinuous solid curves 32 and 34 to indicate the actual current flow, and dotted curves 36 and 37 to indicate the sine wave configuration of the current in the absence of switching means 12. Since the load circuit 16 is reactive, such as inductive in the event it is a single phase AC motor, it will be assumed that the load current curve 35 lags the source potential curve 30 by a predetermined angle $\theta$, with the current through the AC switching means 12 represented by curve 32 terminating at current zero, indicated by point 38, which point lags the voltage zero point 40 of the source potential curve 29 by the angle $\theta$. When the AC switching means 12 becomes nonconductive at current zero, indicated by point 38, the potential across the AC switch represented by solid curve 42, immediately assumes the magnitude of the supply potential, represented by curve 29. The commutation spike 44 on the switch potential curve 42, which occurs at turn off with inductive loads, must be limited to a value below the breakover voltage of the AC switching means, or it will immediately resume conduction. This may be accomplished by limiting the rate of voltage change across the switching means 12 with a series RC circuit, as will be hereinafter explained. When the current zero point 38 is reached, and the positive voltage 42 appears across the AC switching means 12, the voltage across Zener diode 24, shown generally at curve 44, will rise steeply along curve portion 46 to a substantially constant magnitude, represented by curve portion 48. When the AC switching means 12 receives a firing pulse from firing circuit 30 and it switches to its conductive state, the voltage across Zener diode 24 will drop to zero, represented by curve portion 50. The AC switch potential will also drop to substantially zero, represented by curve portion 52, and the AC switch current will rise along curve 34 to join the dotted curve 36. Thus, a voltage pulse 51 is formed, initiated by the "opening" of AC switching means 12, terminated by the "closing" of AC switching means 12, and having a magnitude equal to the Zener voltage of Zener diode 24.

Thus, a positive voltage pulse has been provided during the positive half cycle of the source potential 14, i.e., when terminal T2 of AC switching means 12 is positive, which pulse is initiated by the switching of the AC switching means 12 to its high impedance state. Regardless of the circuit power factor, the voltage pulse across Zener diode 24 is initiated at current zero of the AC switch current. The production of a similar positive voltage pulse when the polarity at the AC switch terminals is reversed, during the negative half cycle 33 of the source potential curve 29 shown in FIG. 2, will now be described.

During the positive half cycle 31 of the source potential 14, electrical energy is stored in a capacitor 60, with the charge voltage on capacitor 60 being determined by a voltage divider connected across the source potential 14. The voltage divider includes an asymmetrically conductive device, such as a semiconductor diode 62 having an anode electrode $a$ and a cathode electrode $c$, resistors 64 and 66, and a semiconductor switching means, which may be an NPN junction type transistor 68, having base, collector and emitter electrodes $b$, $c$ and $e$, respectively. The diode 62, resistors 64 and 66, and the collector-emitter electrodes $c$ and $e$ of transistor 68 are serially connected across source potential 14, from conductor 18 to conductor 20, with diode 62 being poled to allow capacitor 60 to charge when conductor 18 is positive. Capacitor 60 is connected to conductor 69, which connects resistors 64 and 66, and will charge to the potential of this conductor when transistor 68 is switched to its conductive state. The base electrode $b$ of transistor 68 is connected to a voltage divider, which includes resistors 70 and 72. Resistors 70 and 72 are serially connected from conductor 69 to conductor 22. The base electrode $b$ of transistor 68 is connected to the junction 74 between resistors 70 and 72 and is biased to its conductive state when terminal T2 is positive.

To allow capacitor 60 to charge the positive half cycle of the source potential, and to then supply electrical energy to the Zener diode during the negative half cycle, the junction 75 between resistors 66 and the collector electrode $c$ of transistor 68 is connected to the cathode electrode $c$ of Zener diode 24 through an asymmetrically conductive device 76, such as a semiconductor diode having an anode electrode $a$ and a cathode electrode $c$. Diode 76 has its anode electrode *a* connected to junction 75, and is, therefore, reverse biased during the positive half cycle of the source potential, as it is connected to conductor 20 through conductive transistor 68.

The circuit is completed by a resistor 80, which is connected between the collector and base electrodes of transistor 68, and an asymmetrically conductive device 82, such as a semiconductor diode having a cathode electrode *c* and an anode electrode *a*, connected between the emitter and base electrodes of transistor 68, with its anode electrode *a* being connected to the emitter electrode.

Thus, when terminal T2 of AC switching means 12 is positive, and while voltage pulse 51 is being developed across Zener diode 24, transistor 68 is biased into conduction which completes the voltage divider comprising resistors 64 and 66, and charges capacitor 60 to the peak voltage of conductor 69. When the supply potential starts negative at point 84, as shown in FIG. 2, the potential across the AC switch will be substantially zero, as it is still conducting load current and is in its low impedance state, as shown in curve portion 34 in FIG. 2. The positively charged capacitor 60 will therefore keep transistor 68 conductive until the AC switch current drops to zero at point 86, at which time the voltage at terminal T2 of AC switching means 12 will become negative, as indicated at point 88, biasing transistor 68 into its nonconductive state. Diode 82 keeps the base electrode *b* of transistor 68 from becoming too negative with respect to its emitter electrode *b*. Resistor 80 increases the base drive to slow down the switching of transistor 68 from its conductive to its nonconductive state, in order to reduce the rate of rise of the collector voltage and, therefore, the rate of rise of the voltage across the Zener diode 24, which simulates the rate of rise of the Zener voltage during the positive half cycle. The voltage across Zener diode 24 increases along curve portion 90, shown in FIG. 2, until reaching its Zener voltage 92, at which point Zener diode 24 will conduct reverse current and maintain a substantially constant voltage drop, which voltage is applied to the firing circuit 30. This voltage is also synchronized with the "opening" of AC switching means 12, which initiates the timing of the firing circuit 30, and when a firing pulse is applied to AC switching means 12, the voltage across the AC switching means will drop to substantially zero along curve portion 94, shown in FIG. 2. The voltage across Zener diode 24 will drop to zero along curve portion 96, and the AC switch current will begin to rise along curve 98. Thus, a voltage pulse 99 is created across Zener diode 24 during the negative half cycle 33 of the source potential 14, which is initiated by the opening of the AC switch means 12, terminated by the closing of the AC switch means 12, and it has a magnitude equal to the Zener voltage of Zener diode 24.

The circuit shown in FIG. 1, therefore, provides positive voltage pulses synchronized with the condition of AC switching means 12, which pulses may be used by firing circuit 30 to initiate the timing of the firing pulses for the AC switching means 12. The changing polarity of the AC switch terminals, and the angle between the circuit voltage and circuit current, therefore, do not complicate the firing circuit, and since the potential across Zener diode 24 is always positive, the firing circuit 30 may be connected across Zener diode 24 and to the gate electrode G of switching means 12, without requiring an isolation transformer.

Figure 3:
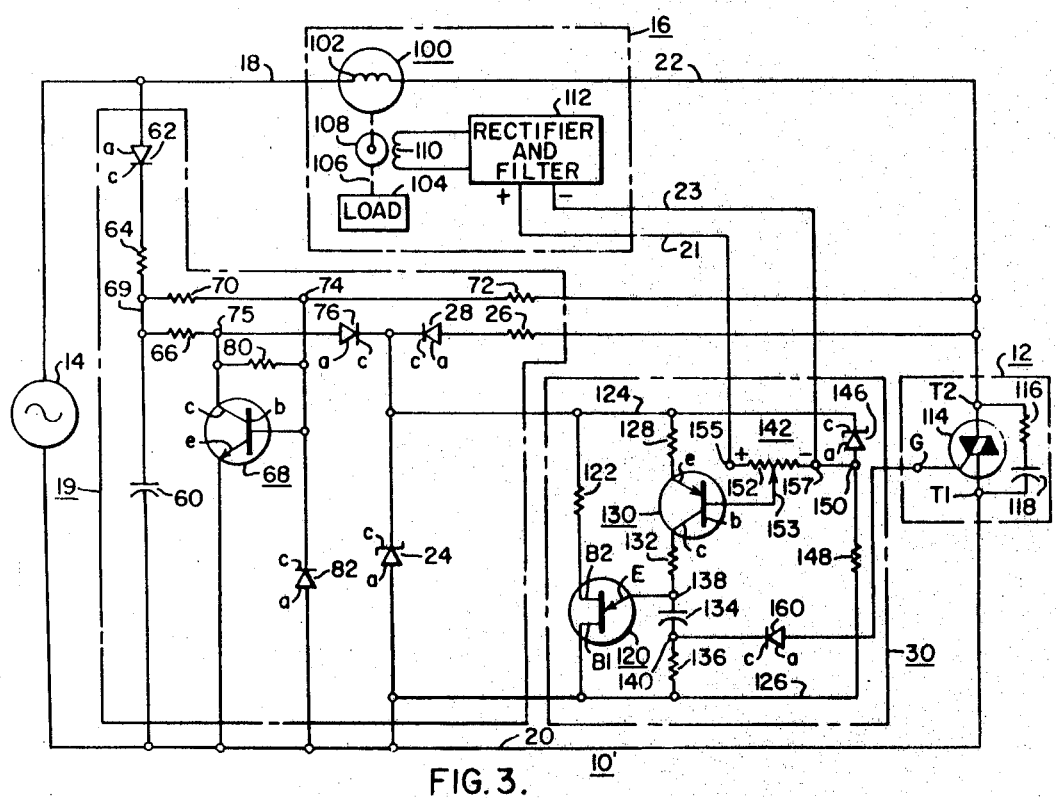
FIG. 3 is a schematic diagram of a speed control system which utilizes the electrical circuit of FIG. 1.

FIG. 3 is a schematic diagram which illustrates the electrical circuit 10 of FIG. 1 in a specific application of controlling the speed of a single phase AC motor, with the circuit of FIG. 3 being referenced generally with the numeral 10'. Like reference numerals in FIGS. 1 and 3 indicate like components.

Load circuit 16 includes an AC motor 100, having a main or running winding 102. AC motor 100 may be capacitor start, split phase, shaded pole, or any other suitable type, with start windings, capacitors, relays, centrifugal switches and the like, not being shown as they are well known in the art. The AC motor drives a load 104 via a shaft, indicated generally by dotted line 106. Feedback means is also included which develops a unidirectional potential having a magnitude responsive to the motor speed. The feedback means, as shown in FIG. 3, may be a tach 108 driven by the motor shaft 106, which develops a potential in winding 110 responsive to the motor speed. The potential developed in winding 110 is rectified and filtered by a circuit shown generally at 112, and the output of this circuit is connected to feedback conductors 21 and 23.

The AC switching means 12 may be a silicon semiconductor switch or TRIAC, illustrated by the symbol 114, with a series connected RC circuit comprising resistor 116 and capacitor 118 being connected across its main electrodes to terminals T1 and T2, in order to reduce the rate of rise of the voltage ($dv/dt$) across the TRIAC when it switches to its non-conductive state, limiting transient voltages below the magnitude of the breakover voltage of the device.

Firing circuit 30 may be of the unijunction transistor type, including a unijunction transistor 120 having base one, base two and emitter electrodes, B1, B2 and E, respectively. Electrode B2 is connected through current limiting resistor 122 to the cathode electrode C of Zener diode 24, via conductor 124, and electrode B2 is connected to the anode electrode *a* of Zener diode 24 via conductor 126. A series circuit comprising resistor 128, junction transistor 130, resistor 132, capacitor 134, and resistor 136, is also connected between conductors 124 and 126, respectively, with the emitter electrode E of unijunction transistor 120 being connected to the junction 138 between resistor 132 and capacitor 134. Transistor 130, which may be of the PNP junction type, has its emitter and collector electrodes *e* and *c*, respectively, connected in the series circuit, and its base electrode *b* is connected to a circuit 142 which provides a bias signal responsive to the deviation of the speed of the AC motor 100 from a predetermined selected magnitude.

Circuit 142 may provide a reference voltage of suitable magnitude by connecting a Zener diode 146, having cathode and anode electrodes *c* and *a*, respectively, and a resistor 148, serially across conductors 124 and 126, with an adjustable resistor 152 being connected between the base electrode *b* of transistor 130 and the junction 150 between Zener diode 146 and resistor 148. The feedback conductors 21 and 23 may be connected across terminals 155 and 157 of adjustable resistor 152, and the base electrode *b* may be connected to the movable arm 153 of the adjustable resistor. Thus, any difference between the reference voltage at terminal 150 and the voltage between movable arm 153 and terminal 157 is applied to the base electrode *b* of transistor 130. The impedance of transistor 130 is, therefore, responsive to the speed of the AC motor 100, and the charging rate of capacitor 134 is likewise responsive to the speed of the AC motor 100.

Capacitor 134 starts to charge when a voltage appears across Zener diode 24, and it will charge at a rate responsive to the impedance of transistor 130. When the charge on capacitor 134 exceeds the voltage between electrodes B1 and B2 of unijunction transistor 120, times the intrinsic standoff ratio of the unijunction transistor, emitter E of the unijunction transistor will be forward biased and capacitor 134 will discharge. A negative firing pulse is developed by the discharging capacitor 134 at junction 140 between capacitor 134 and resistor 136, which is applied to the gate terminal G of AC switching means 12. Since the firing pulse for AC switching means 12 is provided by the discharging capacitor 134, its output impedance is low. Therefore, junction 140 may be connected to the gate electrode G of AC switching means 12 through a diode 160, in order to simulate a high impedance firing source.

Thus, in summary, firing circuit 30 provides a firing pulse for AC switching means 12 each half cycle of a source potential 14, with the timing of the firing circuit 30 being referenced from the "opening" of the AC switching means, as signaled by the control voltage pulse, and the production of the firing pulse is responsive to the speed of the AC motor 100. The speed to be regulated may be changed by changing the setting of the adjustable resistor 152. The speed control circuit 10' shown in FIG. 3 provides negative firing pulses for the AC switching means 12, without requiring any isolating power transformer or pulse transformer, and may use any conventional firing circuit which is initiated by a positive control pulse.

While the invention has been described relative to producing synchronized positive voltage pulses, it will be understood that synchronized negative pulses may be produced by utilizing complementary components in the same basic circuitry. Synchronized negative voltage pulses would be required, for example, for a firing circuit which utilizes a complementary unijunction transistor.

In summary, there has been disclosed a new and improved control voltage circuit which provides similar control voltage pulses of like polarity, synchronized with the "opening" of a controllable solid state AC switch, regardless of the polarity of the terminals of the AC switch. This control voltage circuit may be used to supply a voltage to a phase controlled firing circuit for the AC switch, eliminating the necessity of utilizing an isolating transformer, or otherwise unduly complicating the firing control circuity. Also disclosed is a speed control system for single phase AC motors, which may utilize the new control voltage circuit.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. An electrical circuit for providing voltage pulses of like polarity responsive to the switching of a bilateral AC switch, comprising:
   a source of alternating potential,
   a load circuit,
   bilaterally controllable AC switching means connected serially with said source of alternating potential and said load circuit,
   first means connected across said AC switching means providing a voltage of predetermined polarity and magnitude during a predetermined half cycle of said source potential, initiated by the switching of said AC switching means to its high impedance condition,
   second means connected across said source of alternating potential for storing electrical energy from said source potential during said predetermined half cycle,
   and third means operatively connecting said first and second means during the other half cycle of said source potential, providing a voltage of said predetermined polarity and magnitude, initiated by the switching of said AC switching means to its high impedance condition, and with the electrical energy being supplied by the stored energy of said second means.

2. The electrical circuit of claim 1 wherein the predetermined polarity of said voltage pulse is positive and said predetermined half cycle of said source potential is positive.

3. The electrical circuit of claim 1 wherein said first means includes a serially connected voltage regulating diode and asymmetrically conductive means, said asymmetrically conductive means being poled to develop the predetermined regulated voltage across the voltage regulating diode during said predetermined half cycle of the source potential.

4. The electrical circuit of claim 1 wherein said second means includes a voltage divider network, said voltage divider network including switching means which operatively connects said voltage divider network across said source potential during said predetermined half cycle of the source potential, a capacitor connected to said voltage divider network, and asymmetrically conductive means poled to allow said capacitor to charge during said predetermined half cycle; and, said third means includes asymmetrically conductive means poled to allow said capacitor to discharge through said first means during the remaining half cycle, when said AC switching means switches to its high impedance condition.

5. The electrical circuit of claim 1 wherein said first means includes a serially connected voltage regulating diode and asymmetrically conductive means, said asymmetrically conductive means being poled to develop the predetermined regulated voltage across the voltage regulating diode during said predetermined half cycle of the source potential, said second means includes a voltage divider network including switching means which operatively connects said voltage divider network across said source potential during said predetermined half cycle of the source potential, a capacitor connected to said voltage divider network and asymmetrically conductive means poled to allow said capacitor to charge during said predetermined half cycle, and said third means includes asymmetrically conductive means poled to allow said capacitor to discharge through said first means during the remaining half cycle, when said AC switching means switches to its high impedance condition.

References Cited

UNITED STATES PATENTS

| | | | |
|---|---|---|---|
| 3,146,392 | 8/1964 | Sylvan | 323—24 X |
| 3,346,744 | 10/1967 | Howell | 307—252 |
| 3,436,562 | 4/1969 | Harris | 307—252 |

ROBERT K. SCHAEFER, Primary Examiner

T. B. JOIKE, Assistant Examiner

U.S. Cl. X.R.

307—252